US012632419B2

(12) United States Patent
Xie et al.

(10) Patent No.: US 12,632,419 B2
(45) Date of Patent: May 19, 2026

(54) COMPRESSED SIGNAL PROPAGATION PIPELINE

(71) Applicant: Microsoft Technology Licensing, LLC, Redmond, WA (US)

(72) Inventors: Yin Xie, Bellevue, WA (US); Ahmed Hassan Mohamed, Bellevue, WA (US); Danilo Landucci Benzatti, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/785,663

(22) Filed: Jul. 26, 2024

(65) Prior Publication Data

US 2026/0030212 A1 Jan. 29, 2026

(51) Int. Cl.
*G06F 16/17* (2019.01)
*G06F 16/174* (2019.01)
*G06F 16/182* (2019.01)

(52) U.S. Cl.
CPC ........ *G06F 16/1744* (2019.01); *G06F 16/182* (2019.01)

(58) Field of Classification Search
CPC ........................... G06F 16/1744; G06F 16/182
USPC ........................................................ 707/693
See application file for complete search history.

(56) References Cited

U.S. PATENT DOCUMENTS 12,135,213 B1 * 11/2024 Grundy .................. G01C 21/16
2014/0053137 A1 * 2/2014 Buehler .................... G06F 8/20
717/126

2016/0301566 A1 * 10/2016 Ramasubramani ..... H04L 67/34
2018/0107705 A1 * 4/2018 Gitelman .............. G06F 16/254
2019/0236058 A1 * 8/2019 Komala .................. H04L 67/02
2020/0294401 A1 * 9/2020 Kerecsen ............... G08G 1/205
2021/0382900 A1 * 12/2021 Mantzouratos ..... G06F 16/2477
2023/0290452 A1 * 9/2023 Kast ....................... G16H 50/20
(Continued)

FOREIGN PATENT DOCUMENTS

CN 100555935 C * 10/2009
CN 108446107 A * 8/2018 .......... G06F 11/3668
CN 113170241 A * 7/2021 ........... H04L 1/1819
(Continued)

OTHER PUBLICATIONS

International Search Report and Written Opinion received for PCT Application No. PCT/US2025/028289 mailed on Sep. 26, 2025, 13 pages.

*Primary Examiner* — Hicham Skhoun
(74) *Attorney, Agent, or Firm* — Schwegman Lundberg & Woessner, P.A.

(57) ABSTRACT

A computer-implemented method for compressed compact data storage and processing within a cloud-based environment is disclosed. In one aspect, the method for processing data signals, includes receiving a plurality of data signals corresponding to a user, the plurality of data signals includes a plurality of user raw records at corresponding time values, compressing the plurality of data signals using an incremental compression algorithm to form a single compressed iterative record, organizing the single compressed iterative record into hierarchical segments based on predefined time intervals using a waterfall data model, and storing the single compressed iterative record in a first cloud storage system.

20 Claims, 8 Drawing Sheets

(56)         References Cited

U.S. PATENT DOCUMENTS

2025/0168607 A1 *   5/2025  Qi ........................... H04W 4/38

FOREIGN PATENT DOCUMENTS

CN          113236543  A  *   8/2021   .............. F04B 51/00
CN          117762682  A  *   3/2024
WO      WO-2024210979  A1 *  10/2024   ......... G06F 16/2471

* cited by examiner

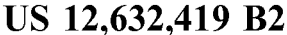
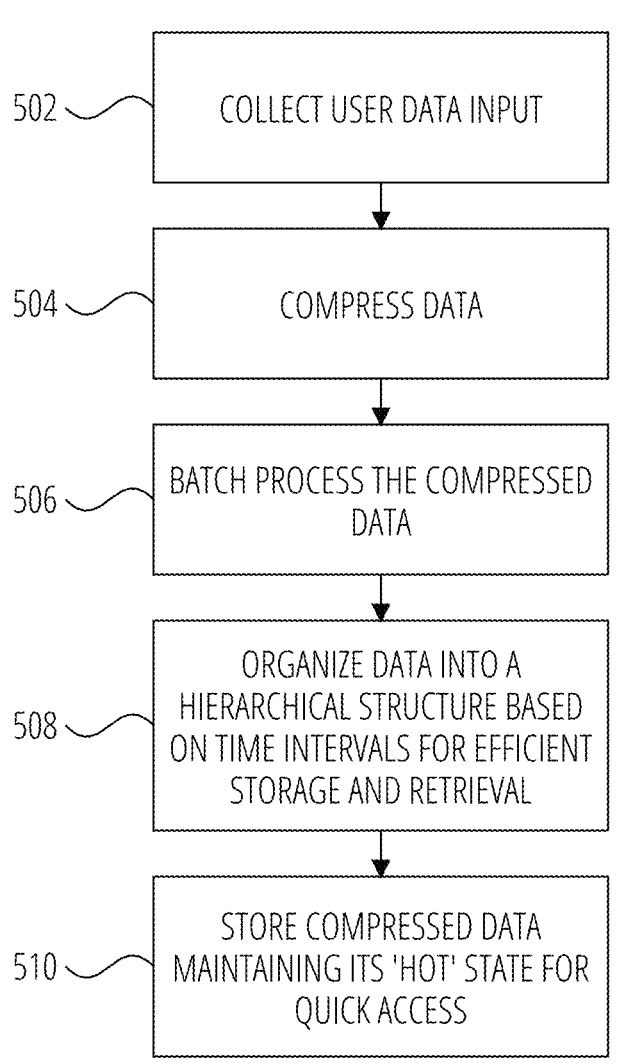
502 — COLLECT USER DATA INPUT
504 — COMPRESS DATA
506 — BATCH PROCESS THE COMPRESSED DATA
508 — ORGANIZE DATA INTO A HIERARCHICAL STRUCTURE BASED ON TIME INTERVALS FOR EFFICIENT STORAGE AND RETRIEVAL
510 — STORE COMPRESSED DATA MAINTAINING ITS 'HOT' STATE FOR QUICK ACCESS
FIG. 5

602 CHECK FOR INCREMENTAL UPDATES

604 UPDATE DATA INCREMENTALLY

606 INTEGRATE DATA WITH CLOUD STORAGE

608 REAL-TIME ANALYSIS

610 OUTPUT PROCESSED DATA

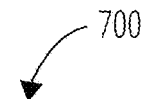

700

RECEIVE A PLURALITY OF DATA SIGNALS CORRESPONDING TO A USER, THE PLURALITY OF DATA SIGNALS COMPRISING A PLURALITY OF USER RAW RECORDS AT CORRESPONDING TIME VALUES 702

COMPRESS THE PLURALITY OF DATA SIGNALS USING AN INCREMENTAL COMPRESSION ALGORITHM TO FORM A SINGLE COMPRESSED ITERATIVE RECORD 704

ORGANIZE THE SINGLE COMPRESSED ITERATIVE RECORD INTO HIERARCHICAL SEGMENTS BASED ON PREDEFINED TIME INTERVALS USING A WATERFALL DATA MODEL 706

STORE THE SINGLE COMPRESSED ITERATIVE RECORD IN A FIRST CLOUD STORAGE SYSTEM 708

FIG. 7

COMPRESSED SIGNAL PROPAGATION PIPELINE

TECHNICAL FIELD

The subject matter disclosed herein generally relates to the technical field of data processing, specifically focusing on the efficient management, compression, and retrieval of large volumes of data signals. Specifically, the present application describes methods for incremental compression and a waterfall data model to enhance data storage efficiency and facilitate dynamic, real-time data analysis across various platforms.

BACKGROUND

In the field of data processing, especially in environments that deal with large volumes of user-generated data, it is crucial to efficiently store, retrieve, and analyze data. Traditional systems often struggle with the vast amount of data, resulting in higher storage costs, slower data retrieval, and challenges in real-time data analysis. These systems typically process and store each data signal separately, consuming significant computational resources and limiting the system's ability to provide timely insights. Additionally, conventional methods involve complete decompression and recompression of data for every update, significantly slowing down the process and increasing the computational load.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flow diagram illustrating a method for batch processing compressed data.

FIG. 7 illustrates a routine 700 in accordance with one embodiment.

DETAILED DESCRIPTION

Figure 1:
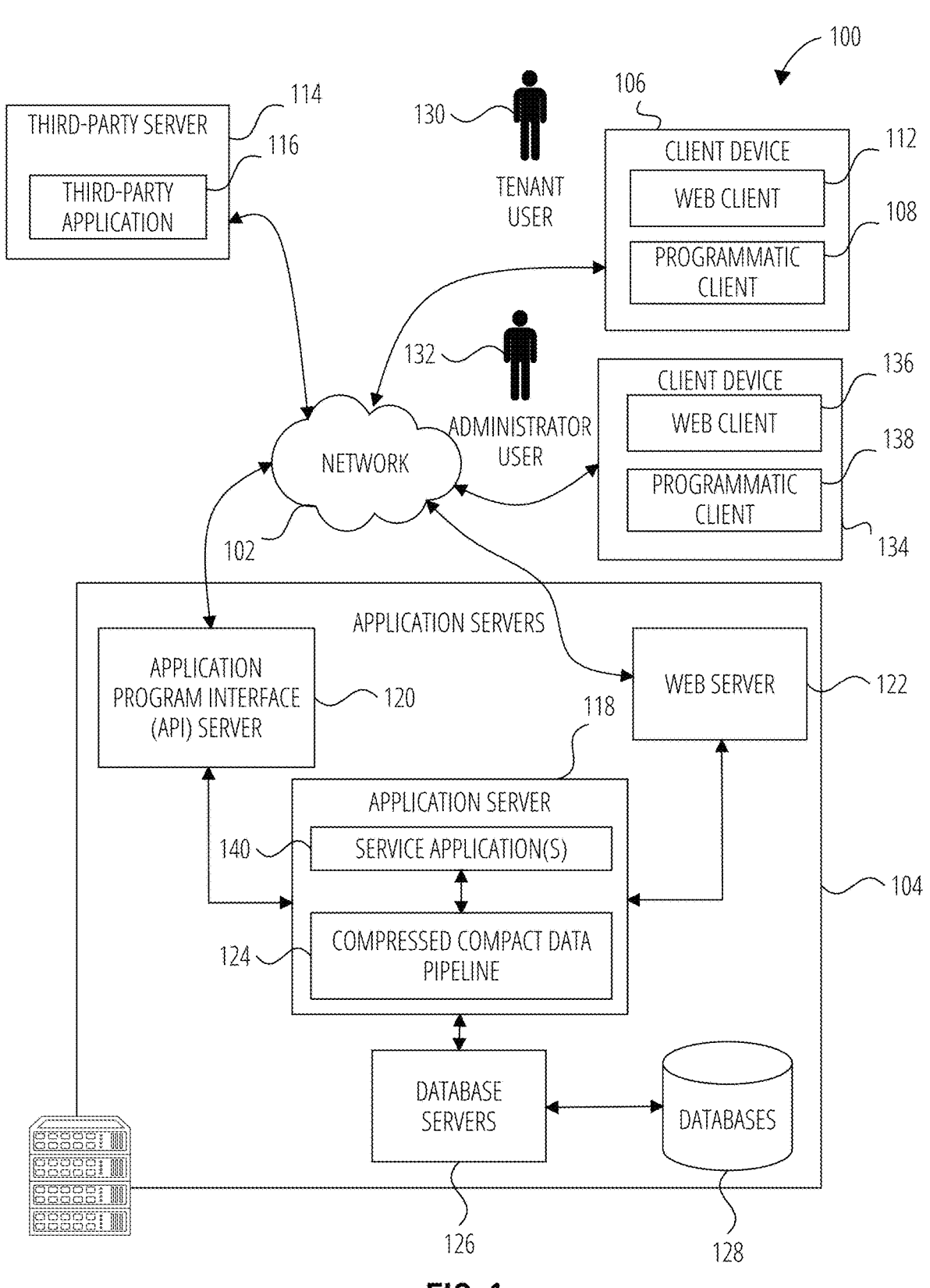
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The system described in this application is designed to tackle the challenges involved in handling and analyzing large volumes of data signals in real time. Traditional data processing systems often face issues with high storage costs, slow retrieval speeds, and inefficient data handling, especially when dealing with extensive amounts of user-generated data. The described data processing system enhances the approach to data compression, storage, and retrieval by introducing a combination of incremental compression techniques and a dynamic "Waterfall Data Model," significantly improving the efficiency and performance of data systems.

In an example, the term "Waterfall Data Model" used in the present disclosure refers to a structured data architecture for data storage and management that organizes data into a hierarchical, sequential format based on time or logical progression. This model is designed to facilitate the efficient storage, retrieval, and updating of data by allowing new information to be added incrementally without the need to reorganize or redistribute the entire dataset. For example, the Waterfall Data Model works by appending new data entries at the end of a "data blob" or a continuous stream, much like water cascading down a series of steps. Each "step" or layer in the model represents a specific time interval or a logical segment of data, enabling quick access to different periods or categories of data. This method can be used in environments where data is continuously generated and is to be accessed both in real-time and in historical contexts, such as in financial transactions, log data management, or real-time monitoring systems. The model enhances data integrity and query efficiency for applications that require rapid data appending and time-based data retrieval.

In an example, a compressed compact data pipeline utilizes a data compression module that employs advanced algorithms to reduce the size of incoming data signals without compromising data integrity. This module minimizes storage requirements and optimizes data transmission across networks. In addition, the Waterfall Data Model organizes data into a hierarchical structure based on time intervals (such as days, weeks, or months) or logical progression, facilitating efficient data updates and rapid retrieval. This model allows the system to maintain data in a 'hot' state, ready for immediate analysis and decision-making processes.

Furthermore, the compressed compact data pipeline includes a batch-processing engine that aggregates multiple data signals into a single compressed record. This not only reduces the computational load but also improves the system's throughput. The dynamic update mechanism within the pipeline ensures that data can be incrementally updated without the need for full decompression, maintaining high data integrity and availability. Integrated seamlessly with cloud storage solutions, the system supports scalable and secure data operations, making it a robust and efficient solution for enterprises requiring real-time data analytics capabilities.

The compressed compact data pipeline offers several advantages and improvements over traditional data processing systems. Examples of advantages and improvements include enhanced data compression (e.g., incremental compression techniques resulting in significant reductions in data size), dynamic data storage with Waterfall Data Model (e.g., unlike conventional linear data storage models, the Waterfall Data Model organizes data into a hierarchical, time-segmented structure, resulting in more efficient data updates and faster retrieval by allowing operations to target specific "layers" of data), improved data retrieval speed (e.g., by maintaining data in a compressed yet 'hot' state, the compressed compact data pipeline enables rapid data access and decompression. This is important for applications requiring real-time data analysis and decision-making. In another example, data is buffered for seconds or minutes and then flushed out after being accumulated in memory. This process may be referred to as near real-time data retrieval), batch processing efficiency (e.g., the compressed compact data pipeline's batch processing engine aggregates multiple data signals into a single compressed record before processing, significantly enhancing throughput and processing speed), incremental update capability (e.g., the compressed compact data pipeline's ability to handle incremental updates without full decompression allows for continuous data integrity and freshness), scalability and cloud integration (e.g., the compressed compact data pipeline integrates into cloud storage solutions like Azure Data Lake, making it inherently scalable and capable of handling increasing data volumes without a proportional increase in infrastructure).

In one example embodiment, a computer-implemented method for efficiently storing and processing data within a cloud-based environment is described. The method involves receiving multiple data signals associated with a user, comprising raw records at specific time values. These data signals are compressed using an incremental compression algorithm to create a single compressed iterative record, which is then organized into hierarchical segments based on predefined time intervals using a waterfall data model. Finally, the single compressed iterative record is stored in a first cloud storage system.

The methodologies described in this document help to solve the technical problem of having to fully decompress and recompress data for every update. This process slows down significantly and increases the computational load. These methodologies may eliminate the need for certain computing resources such as processor cycles, network traffic, memory usage, data storage capacity, power consumption, network bandwidth, and cooling capacity.

In an example, the term "domain," as used here, refers to the classification of data based on its type, source, or nature. For example, user data, transaction data, or sensor data could each be considered different domains. This classification helps in effectively managing data, applying specific processing rules, and maintaining data integrity. In other contexts, the term "domain" can also refer to a specific technical environment or platform where data operations are carried out. For instance, in cloud computing, a domain might refer to a particular set of services or a configuration within a cloud provider's offerings, such as Azure's environment where data processing and storage services like Azure Data Lake or Synapse operate. "Azure" is a trademark of Microsoft Inc.

In an example, the term "tenant," as used here, refers to a customer or an organization that subscribes to cloud services provided by a host company. This term can also be used in cloud computing and software-as-a-service (SaaS) models to describe an independent instance of the software application and its associated data. Each tenant's data is isolated and remains invisible to other tenants. In the specific context of the present application, a tenant would be an entity, such as a company or organization, that uses the cloud-based platform for creating, managing, and utilizing semantic indexes for their data. This data could include files, emails, and other content types (e.g., videos, charts, text, and audio).

In an example, the term "substrate" used herein, refers to an infrastructure layer that provides essential services and capabilities for data processing, such as data storage, data management, and connectivity.

In an example, the term "data signal" used herein, refers to any form of digital information generated by user interactions, system processes, or sensor outputs that can be captured and analyzed to derive insights. This encompasses a wide range of data types, including but not limited to clicks, transactions, log entries, sensor readings, and other forms of user-generated or system-generated data. In a broader context, "data signals" can also be considered as "records," where each record represents a discrete instance of data captured at a specific point in time or under specific conditions. These records are structured and stored in databases or data lakes and are used to track, analyze, and predict patterns or behaviors based on the accumulated data.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106 and client device 134. A tenant user 130 operates the client device 106. The client device 106 includes a web client 112 (e.g., a browser) and a programmatic client 108 (e.g., an incident management application) that is hosted and executed on the client device 106. An administrator user 132 operates the client device 134. The client device 134 includes a web client 136 and a client device 134. The administrator user 132 is typically responsible for the configuration, management, and oversight of service application(s) 140 and/or compressed compact data pipeline 124 operations from an administrative perspective. The administrator user 132 has elevated privileges that allow them to set up and modify the system settings, manage user access controls, and oversee the overall health and security of the service application(s) 140 and/or compressed compact data pipeline 124.

The tenant user 130 refers to individuals who are consumers of the service application(s) 140's capabilities within a specific tenant environment. The tenant user 130 interacts with service application(s) 140 primarily through web client 112 or programmatic client 108, to perform various data-related tasks where the user interactions and activities result or generate data signals.

An Application Program Interface (API) server 120 and a web server 122 provide respective programmatic and web interfaces to application servers 104. A specific application server 118 hosts a service application(s) 140 and a compressed compact data pipeline 124 that includes components, modules, and/or applications (described in more detail below with respect to FIG. 2.

In the example context of enterprise applications, the service application(s) 140 includes applications used within businesses, such as Microsoft Office suite, CRM (Customer Relationship Management) systems, ERP (Enterprise Resource Planning) software, and collaboration tools like Microsoft Teams, generate signals from user interactions with the software. The signal data can be used to analyze user behavioral data, optimize workflows, enhance productivity, and improve user experience.

The compressed compact data pipeline 124 communicates with the service application(s) 140. In one example, the compressed compact data pipeline 124 receives signal data from the service application(s) 140 where the signal data indicates a user interaction or operations from the tenant user 130. The compressed compact data pipeline 124 is designed to efficiently handle and analyze large volumes of data generated from various sources. For example, the compressed compact data pipeline 124 operates by first aggregating individual data signals into a batch, which are then compressed into a single, compact format using compression algorithms. The compressed data is organized using a Waterfall Data Model, which allows for continuous and iterative additions without the need to decompress or reorganize existing data, thus maintaining high efficiency and data integrity. The compressed compact data pipeline 124 integrates seamlessly with cloud storage solutions, enabling the stored data to remain in an accessible 'hot' state for real-time processing and analysis. This compressed compact data pipeline 124 is particularly beneficial for environments where data is voluminous and continuously updated, as it ensures quick access, reduces latency, and optimizes storage and computational resources. An example embodiment of the compressed compact data pipeline 124 is described further below with respect to FIG. 2.

The application server 118 is shown to be communicatively coupled to database servers 126 that facilitates access to an information storage repository or databases 128. In an example embodiment, the databases 128 include storage devices that store information to be processed by the compressed compact data pipeline 124.

Additionally, a third-party application 116 may, for example, store another part of the compressed compact data pipeline 124, or include a cloud storage system. For example, the third-party application 116 stores other signal data related to the application servers 104. In another example, the third-party server 114 is associated with another server farm that is different from the server farm of the application servers 104. The third-party application 116 executing on a third-party server 114, is shown as having programmatic access to the application server 118 via the programmatic interface provided by the Application Program Interface (API) server 120. For example, the third-party application 116, using information retrieved from the application server 118, may support one or more features or functions on a website hosted by the third party.

Figure 2:
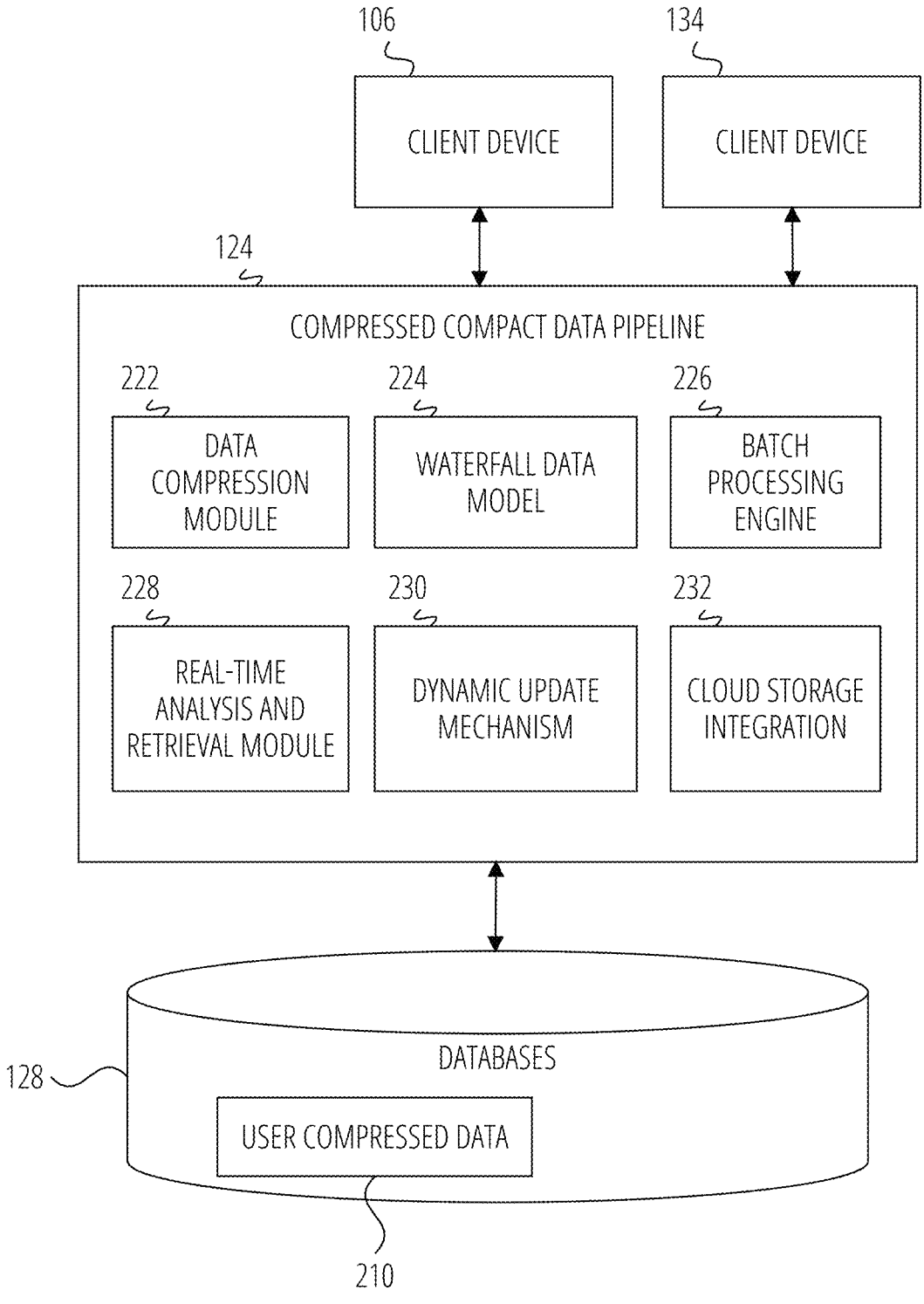
FIG. 2 is a block diagram illustrating a compressed compact data pipeline system in accordance with one example embodiment.

FIG. 2 is a block diagram illustrating the compressed compact data pipeline 124 in accordance with one example embodiment. In one example embodiment, the compressed compact data pipeline 124 comprises a data compression module 222, a waterfall data model 224, a batch processing engine 226, a real-time analysis and retrieval module 228, a dynamic update mechanism 230, and a cloud storage integration 232. The compressed compact data pipeline 124 serves as a core processing unit where data signals are transformed into a more manageable and efficient format.

The data compression module 222 plays a crucial role in the system by employing advanced compression algorithms to compress incoming data signals associated with users. This compression process is designed to significantly reduce data size while preserving data integrity and accessibility. It is important to note that this compression process is incremental, meaning that new data can be added without requiring the decompression of existing data, which ultimately enhances the efficiency and responsiveness of the system.

After compression, the batch processing engine 226 takes over and aggregates multiple compressed data signals into batches, further optimizing the data handling process. This strategy effectively reduces the computational load and improves overall throughput, making it highly suitable for managing large volumes of data in real-time environments.

The waterfall data model 224 provides a structured organization for the compressed data by arranging it into hierarchical segments based on predefined time intervals. This model facilitates efficient data updates and retrieval by structuring the data in a way that optimizes for quick access and minimal disruption to existing data segments. Its continuous, layered approach to organizing data storage supports efficient data updates and retrieval by structuring data into time-based segments (e.g., daily, weekly, monthly). This hierarchical structuring facilitates quicker access to the most relevant data slices and optimizes storage space.

The real-time analysis and retrieval module 228 allows for on-demand analysis and retrieval of compressed data by enabling users or automated systems to efficiently query and access specific data segments. This module supports real-time analytics and enables immediate insights and decision-making based on the latest available data. By maintaining data in a 'hot' state, the real-time analysis and retrieval module 228 can quickly access and decompress only the necessary parts of data for immediate analysis, thus supporting real-time decision-making processes.

Moreover, the dynamic update mechanism 230 ensures the seamless integration of new data into the existing compressed data structure without full decompression. This mechanism is critical for maintaining continuous data integrity and freshness.

Furthermore, the cloud storage integration 232 allows the compressed data to be stored in a cloud environment, taking advantage of cloud scalability and security features. This integration supports secure, scalable, and efficient data storage and access across distributed environments. Additionally, it facilitates advanced data operations such as MapReduce and real-time aggregation, enhancing the system's analytical capabilities.

Figure 3:
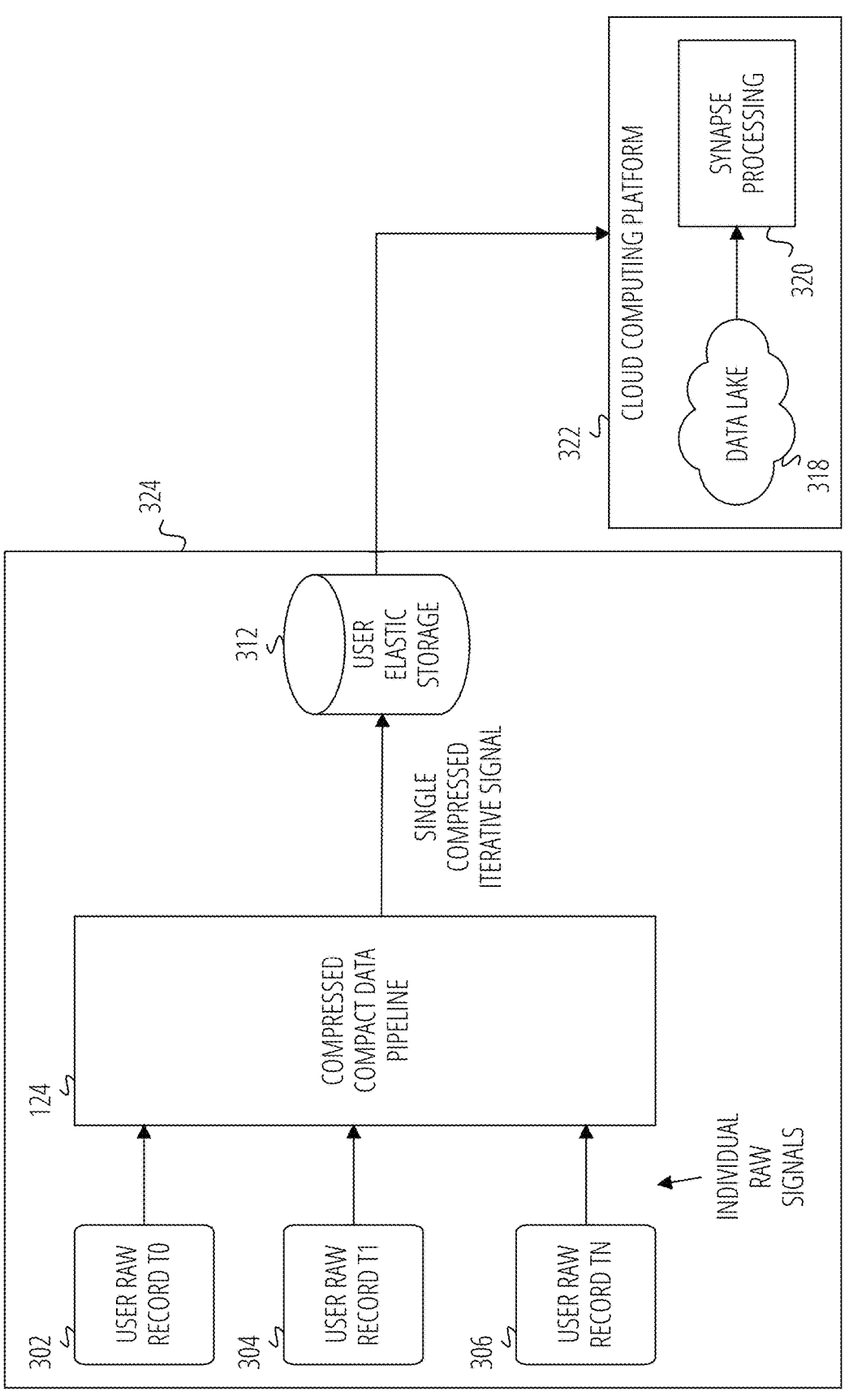
FIG. 3 is a block diagram illustrating an operation of the compressed compact data pipeline in accordance with one example embodiment.

FIG. 3 is a block diagram illustrating an operation of the compressed compact data pipeline in accordance with one example embodiment. In particular, FIG. 3 specifically focuses on the process of handling multiple user data records over time and their integration into a single compressed iterative record. FIG. 3 demonstrates the dynamic and scalable nature of the data handling process, which is designed to accommodate continuous data input and compression in a cloud computing environment.

The user raw records, labeled as T0, T1 through TN, serve as data points collected at various time intervals, displaying a sequence of data generation events from a user or a device. Each record depicts a snapshot of user activity or system status at a specific moment in time.

The compressed compact data pipeline 124 processes these individual raw records. Its primary function is to compress and consolidate these data points into a more manageable and efficient format. For example, the pipeline has the capability to compress multiple user raw records into a single compressed iterative signal or record. This record is dynamic and evolves over time as new data (TN) is added. The pipeline employs an incremental compression algorithm, allowing each new piece of data to be compressed and added to the existing record without requiring decompression. This method significantly enhances data processing efficiency and reduces computational overhead.

The single compressed iterative signal is stored in a user elastic storage 312 within substrate 324. The substrate 324, which includes the compressed compact data pipeline 124 and the user elastic storage 312, is designed to be scalable and flexible, accommodating the expanding size of the compressed data as more records are processed and added over time.

In one illustrative example, the substrate 324 provides the cloud computing platform 322 with the single compressed iterative signal. The cloud computing platform 322 consists of a data lake 318 and synapse processing 320, serving as the infrastructure and resources for the data compression, storage, and retrieval processes. This platform is designed to ensure that the system can scale based on demand and maintains the accessibility and security of the data.

The data lake 318 acts as a repository for storing vast amounts of raw data in its native format. It works in conjunction with the compressed compact data pipeline 124 to provide a comprehensive data management solution supporting both structured and unstructured data.

The synapse processing 320 incorporates an advanced data analytics function that collaborates with the compressed data to extract actionable insights. Examples of advanced data analytics functions include executing complex queries, real-time analytics, and employing machine learning models to enhance decision-making processes based on the data.

Figure 4:
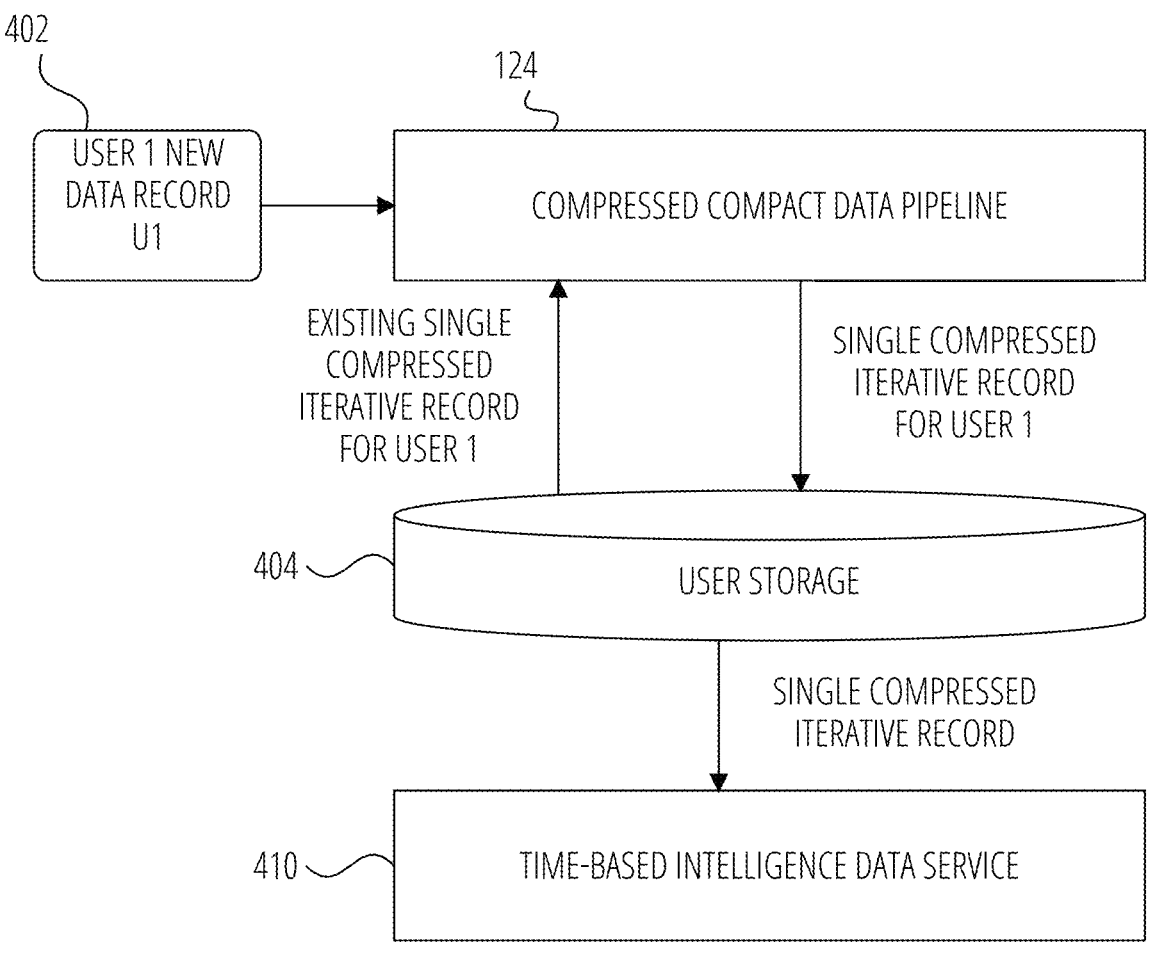
FIG. 4 is a block diagram illustrating updating data in a user storage in accordance with one example embodiment.

FIG. 4 is a block diagram illustrating a detailed schematic of the data handling and updating process within the Compressed Compact Data Pipeline, specifically focusing on how new data records from individual users are integrated into an existing compressed data structure. FIG. 4 provides an example visualization of the incremental update process and the maintenance of time-based intelligence data services.

The system processes a new data signal, which could be a new data record like u1 402 for user 1, through the compressed compact data pipeline 124. This pipeline retrieves the current state of compressed data for User 1 before the new data record is added, representing a cumulative record built over time through previous updates and compressions.

The compressed compact data pipeline 124 seamlessly integrates the new data record u1 into the existing compressed record, illustrating its efficient capability to perform incremental updates without the need to decompress the existing data.

Following this integration, the updated compressed iterative record is stored back into a dedicated storage system for User 1, such as user storage 404. This storage system is designed for quick data retrieval and maintains the data in a 'hot' state, ready for immediate access and analysis.

Subsequently, the time-based intelligence data service 410 leverages the updated compressed data to generate time-sensitive insights and analytics based on the most current data. This real-time intelligence supports decision-making processes that rely on up-to-the-minute information.

FIG. 5 is a flow diagram illustrating a method for compressed compact signal processing in accordance with one example embodiment. Operations in the method 500 may be performed by the compressed compact data pipeline 124, using components (e.g., modules, engines) described above with respect to FIG. 2. Accordingly, the method 500 is described by way of example with reference to the compressed compact data pipeline 124. However, it shall be appreciated that at least some of the operations of the method 500 may be deployed on various other hardware configurations or be performed by similar components residing elsewhere. For example, some of the operations may be performed at the client device 106 or third-party server 114.

FIG. 5 provides a flowchart illustrating the operational steps involved in the compressed compact data pipeline 124, specifically detailing the sequence of actions taken to process, compress, and organize user data for efficient storage and quick retrieval. This figure outlines a systematic approach to handling large volumes of data in a way that optimizes both storage space and access speed.

The process begins at block 502, where the compressed compact data pipeline 124 starts by collecting user data inputs. This step involves the comprehensive gathering of raw data generated from user activities or system interactions, encompassing various forms of digital interactions, sensor data, and transactional data.

Following the data collection, at block 504, the compressed compact data pipeline 124 is designed to significantly decrease the data volume, making it more manageable and cost-effective to store. The compression algorithms employed are meticulously crafted to uphold the data's integrity and accessibility while reducing its size.

Upon completion of the compression process at block 506, the data undergoes batch processing, where compressed data is grouped into batches for more efficient handling. Batch processing plays a pivotal role in optimizing computational resources and streamlining the subsequent steps in the data pipeline.

Advancing to block 508, the compressed and batched data is meticulously organized into a hierarchical structure based on time intervals. This structured approach facilitates efficient storage and quick retrieval. By hierarchically structuring the data, the system can rapidly access the required data segments when they are needed for analysis or decision-making.

Lastly, at block 510, the data is stored in a manner that maintains its 'hot' state, ensuring it remains readily available for immediate access. This feature is especially beneficial for applications that rely on real-time data analysis and demand quick response times.

Figure 6:
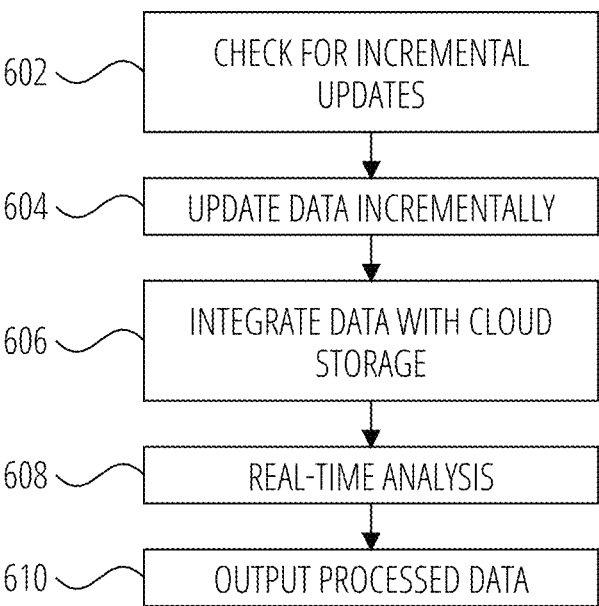
FIG. 6 is a flow diagram illustrating a method for incrementally updating data in accordance with one example embodiment.

FIG. 6 is a flow diagram illustrating a method for incrementally updating data in accordance with one example embodiment. Operations in the method may be performed by the compressed compact data pipeline 124, using components (e.g., modules, engines) described above with respect to FIG. 2. Accordingly, the method is described by way of example with reference to the compressed compact data pipeline 124. However, it shall be appreciated that at least some of the operations of the method may be deployed on various other hardware configurations or be performed by similar components residing elsewhere. For example, some of the operations may be performed at the client device 106 or third-party server 114.

FIG. 6 illustrates a flowchart detailing the operational steps involved in real-time analysis and incremental data updates within the Compressed Compact Data Pipeline 124. This figure focuses on the dynamic aspects of data handling, emphasizing the system's capability to continuously update and analyze data in real-time, ensuring that the data remains current and actionable.

At block 602, the compressed compact data pipeline 124 checks for any incremental updates to the data. This step ensures that any new data elements or modifications to existing data are identified promptly. Incremental updates allow for maintaining the accuracy and relevance of the data, especially in dynamic environments where data changes frequently.

At block 604, following the identification of incremental updates, the data is updated accordingly. This involves integrating new data points into the existing dataset without disrupting the ongoing processes. The incremental update mechanism is designed to be efficient and seamless, minimizing the computational load and reducing the latency typically associated with large-scale data updates.

At block 606, after processing and updating the data, the updated data is integrated with cloud storage solutions. This step ensures data durability and scalability. Cloud storage provides a secure and scalable environment for storing large volumes of data, facilitating access from distributed locations and supporting high availability and disaster recovery strategies.

At block 608, analysis is performed on the updated data as it is received, allowing for instant feedback and actions based on the latest information.

At block 610, the processed data is utilized by downstream applications or end-users. The output can take various forms, such as reports, alerts, visualizations, or direct inputs into other systems. This step marks the completion of the data processing cycle, delivering actionable insights derived from real-time data analysis.

FIG. 7 illustrates a routine 700 in accordance with one embodiment. In block 702, routine 700 receives a plurality of data signals corresponding to a user, the plurality of data signals comprising a plurality of user raw records at corresponding time values. In block 704, routine 700 compresses the plurality of data signals using an incremental compression algorithm to form a single compressed iterative record. In block 706, routine 700 organizes the single compressed iterative record into hierarchical segments based on predefined time intervals using a waterfall data model. In block 708, routine 700 stores the single compressed iterative record in a first cloud storage system.

Figure 8:
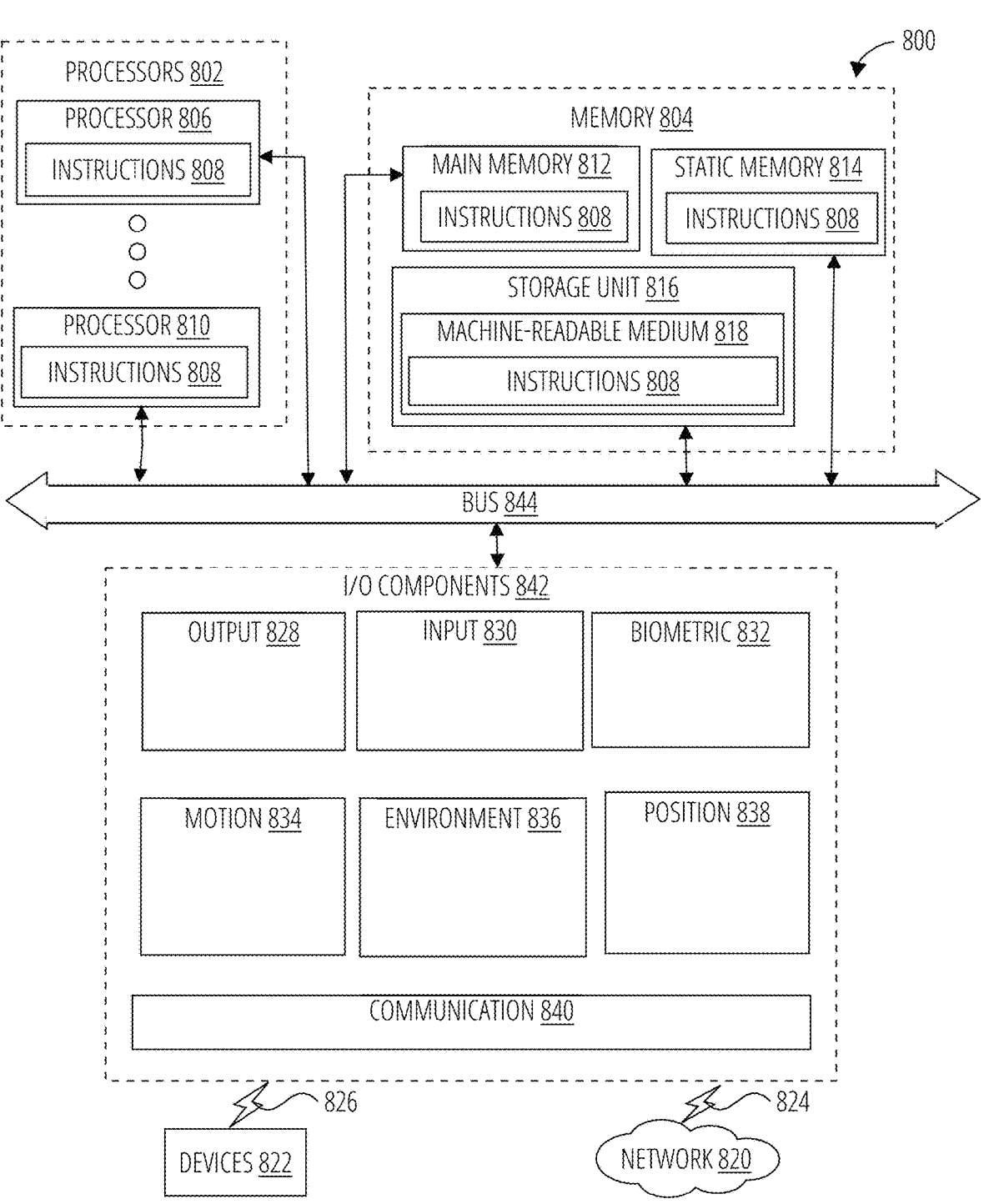
FIG. 8 is a diagrammatic representation of a machine in the form of a computer system within which a set of instructions may be executed for causing the machine to perform any one or more of the methodologies discussed herein, according to an example embodiment.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein.

The machine 800 may include processors 802, memory 804, and I/O components 842, which may be configured to communicate with each other via a bus 844. In an example embodiment, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The memory 804 includes a main memory 812, a static memory 814, and a storage unit 816, both accessible to the processors 802 via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the processor's cache memory), or any suitable combination thereof, during execution thereof by the machine 800.

The I/O components 842 may include a wide variety of components to receive input, provide output, produce output, transmit information, exchange information, capture measurements, and so on. The specific I/O components 842 that are included in a particular machine will depend on the type of machine. For example, portable machines such as mobile phones may include a touch input device or other such input mechanisms, while a headless server machine will likely not include such a touch input device. It will be appreciated that the I/O components 842 may include many other components that are not shown in FIG. 8. In various example embodiments, the I/O components 842 may include output components 828 and input components 830. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 842 may include biometric components 832, motion components 834, environmental components 836, or position components 838, among a wide array of other components. For example, the biometric components 832 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 include acceleration sensor components (e.g., accelerometer), gravitation sensor components, rotation sensor components (e.g., gyroscope), and so forth. The environmental components 836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 842 further include communication components 840 operable to couple the machine 800 to a network 820 or devices 822 via a coupling 824 and a coupling 826, respectively. For example, the communication components 840 may include a network interface component or another suitable device to interface with the network 820. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

The various memories (e.g., memory 804, main memory 812, static memory 814, and/or memory of the processors 802) and/or storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed embodiments.

The instructions 808 may be transmitted or received over the network 820, using a transmission medium, via a network interface device (e.g., a network interface component included in the communication components 840) and using any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Examples

Example 1 is a method comprising: receiving a plurality of data signals corresponding to a user, the plurality of data signals comprising a plurality of user raw records at corresponding time values; compressing the plurality of data signals using an incremental compression algorithm to form a single compressed iterative record; organizing the single compressed iterative record into hierarchical segments based on predefined time intervals using a waterfall data model; and storing the single compressed iterative record in a first cloud storage system.

In Example 2, the subject matter of Example 1 includes, receiving new user data corresponding to the user; applying the incremental compression algorithm to compress the new user data and generate a compressed new user data; retrieving the single compressed iterative record corresponding to the user from the first cloud storage system; generating an updated single compressed iterative record by appending the compressed new user data to the single compressed iterative record without decompressing the single compressed iterative record; and replacing the single compressed iterative record with the updated single compressed iterative record in the first cloud storage system.

In Example 3, the subject matter of Example 2 includes, storing the updated single compressed iterative record in one or more of a plurality of data lakes in a second cloud storage system, each data lake providing the updated compressed iterative record to a corresponding processing application, the processing application comprising one of a time-based intelligence data analytics service application or an offline processing service application.

In Example 4, the subject matter of Example 2 includes, storing the updated single compressed iterative record in a second cloud storage system, wherein the first cloud storage system is associated with a substrate domain of the user, wherein the second cloud storage system is associated with a plurality of domains.

In Example 5, the subject matter of Examples 2-4 includes, storing the updated single compressed iterative record in a data lake of a second cloud storage system, wherein the second cloud storage system comprises a large-scale data storage processor and analytics service application, wherein the large-scale data storage processor and analytics service application are configured to unzip the updated single compressed iterative record in runtime, process the unzipped data, and keep the updated single compressed iterative record stored in a zipped format.

In Example 6, the subject matter of Examples 1-5 includes, aggregating multiple data signals into a batch before compressing, wherein compressing the plurality of data signals includes compressing the multiple data signals in the batch.

In Example 7, the subject matter of Examples 1-6 includes, wherein the single compressed iterative record is maintained in a just-in-time dynamic state for an accessible state without preconfiguring the plurality of data signals for a specific analytics application.

In Example 8, the subject matter of Examples 1-7 includes, providing on-demand decompression and analysis of selected data segments to support real-time analytics and dynamic decision-making processes.

In Example 9, the subject matter of Examples 1-8 includes, retrieving a specific segment of the single compressed iterative record from the first cloud storage system and decompressing only the retrieved segment for analysis; and detecting changes in incoming data signals and applying the changes incrementally to the single compressed iterative record without full decompression.

In Example 10, the subject matter of Examples 1-9 includes, indexing segments of the single compressed iterative record for expediting search and retrieval processes, wherein the single compressed iterative record is stored in a format that minimizes storage space requirements, wherein the format indicates a combination of a signal type value, a start time value, an end time value, a application identifier value, a compliance value, an actor value, an item value, compressed signal values, or compact format values.

Example 11 is a computing apparatus comprising: a processor; and a memory storing instructions that, when executed by the processor, configure the apparatus to perform operations comprising: receive a plurality of data signals corresponding to a user, the plurality of data signals comprising a plurality of user raw records at corresponding time values; compress the plurality of data signals using an incremental compression algorithm to form a single compressed iterative record; organize the single compressed iterative record into hierarchical segments based on predefined time intervals using a waterfall data model; and store the single compressed iterative record in a first cloud storage system.

In Example 12, the subject matter of Example 11 includes, wherein the instructions further configure the apparatus to: receive new user data corresponding to the user; apply the incremental compression algorithm to compress the new user data and generate a compressed new user data; retrieve the single compressed iterative record corresponding to the user from the first cloud storage system; generate an updated single compressed iterative record by appending the compressed new user data to the single compressed iterative record without decompressing the single compressed iterative record; and replace the single compressed iterative record with the updated single compressed iterative record in the first cloud storage system.

In Example 13, the subject matter of Example 12 includes, wherein the instructions further configure the apparatus to: store the updated single compressed iterative record in one or more of a plurality of data lakes in a second cloud storage system, each data lake providing the updated compressed iterative record to a corresponding processing application, the processing application comprising one of a time-based intelligence data analytics service application or an offline processing service application.

In Example 14, the subject matter of Example 13 includes, wherein the instructions further configure the apparatus to: store the updated single compressed iterative record in the second cloud storage system, wherein the first cloud storage system is associated with a substrate domain of the user, wherein the second cloud storage system is associated with a plurality of domains.

In Example 15, the subject matter of Examples 12-14 includes, wherein the instructions further configure the apparatus to: store the updated single compressed iterative record in a data lake of a second cloud storage system, wherein the second cloud storage system comprises a large-scale data storage processor and analytics service application, wherein the large-scale data storage processor and analytics service application are configured to unzip the updated single compressed iterative record in runtime, process the unzipped data, and keep the updated single compressed iterative record stored in a zipped format.

In Example 16, the subject matter of Examples 11-15 includes, wherein the instructions further configure the apparatus to: aggregate multiple data signals into a batch before compressing, wherein compress the plurality of data signals includes compressing the multiple data signals in the batch.

In Example 17, the subject matter of Examples 11-16 includes, wherein the single compressed iterative record is maintained in a just-in-time dynamic state for an accessible state without preconfiguring the plurality of data signals for a specific analytics application.

In Example 18, the subject matter of Examples 11-17 includes, wherein the instructions further configure the apparatus to: provide on-demand decompression and analysis of selected data segments to support real-time analytics and dynamic decision-making processes.

In Example 19, the subject matter of Examples 11-18 includes, wherein the instructions further configure the apparatus to: retrieve a specific segment of the single compressed iterative record from the first cloud storage system and decompressing only the retrieved segment for analysis; and detect changes in incoming data signals and applying the changes incrementally to the single compressed iterative record without full decompression.

Example 20 is a non-transitory computer-readable storage medium, the computer-readable storage medium including instructions that when executed by a computer, cause the computer to: receive a plurality of data signals corresponding to a user, the plurality of data signals comprising a plurality of user raw records at corresponding time values; compress the plurality of data signals using an incremental compression algorithm to form a single compressed iterative record; organize the single compressed iterative record into hierarchical segments based on predefined time intervals using a waterfall data model; and store the single compressed iterative record in a first cloud storage system.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method comprising:

receiving a plurality of data signals corresponding to a user, the plurality of data signals comprising a plurality of user raw records at corresponding time values;

compressing the plurality of data signals using an incremental compression algorithm to form a single compressed iterative record by generating, for each data signal, a compressed chunk and appending the compressed chunk to the end of an existing single compressed iterative record without decompressing the existing single compressed iterative record;

organizing the single compressed iterative record into hierarchical segments based on predefined time intervals using a waterfall data model; and storing the single compressed iterative record in a first cloud storage system.

2. The method of claim 1, further comprising:

receiving new user data corresponding to the user;

applying the incremental compression algorithm to compress the new user data and generate a compressed new user data;

retrieving the single compressed iterative record corresponding to the user from the first cloud storage system;

generating an updated single compressed iterative record by appending the compressed new user data to the single compressed iterative record without decompressing the single compressed iterative record; and replacing the single compressed iterative record with the updated single compressed iterative record in the first cloud storage system.

3. The method of claim 2, further comprising:

storing the updated single compressed iterative record in one or more of a plurality of data lakes in a second cloud storage system, each data lake providing the updated compressed iterative record to a corresponding processing application, the processing application comprising one of a time-based intelligence data analytics service application or an offline processing service application.

4. The method of claim 2, further comprising:

storing the updated single compressed iterative record in a second cloud storage system, wherein the first cloud storage system is associated with a substrate domain of the user, wherein the second cloud storage system is associated with a plurality of domains.

5. The method of claim 2, further comprising:

storing the updated single compressed iterative record in a data lake of a second cloud storage system, wherein the second cloud storage system comprises a large-scale data storage processor and analytics service application, wherein the large-scale data storage processor and analytics service application are configured to unzip the updated single compressed iterative record in runtime, process the unzipped data, and keep the updated single compressed iterative record stored in a zipped format.

6. The method of claim 1, further comprising:

aggregating multiple data signals into a batch before compressing, wherein compressing the plurality of data signals includes compressing the multiple data signals in the batch.

7. The method of claim 1, wherein the single compressed iterative record is maintained in a just-in-time dynamic state for an accessible state without preconfiguring the plurality of data signals for a specific analytics application.

8. The method of claim 1, further comprising:

providing on-demand decompression and analysis of selected data segments to support real-time analytics and dynamic decision-making processes.

9. The method of claim 1, further comprising:

retrieving a specific segment of the single compressed iterative record from the first cloud storage system and decompressing only the retrieved segment for analysis; and detecting changes in incoming data signals and applying the changes incrementally to the single compressed iterative record without full decompression.

10. The method of claim 1, further comprising:

indexing segments of the single compressed iterative record for expediting search and retrieval processes, wherein the single compressed iterative record is stored in a format that minimizes storage space requirements, wherein the format indicates a combination of a signal type value, a start time value, an end time value, a application identifier value, a compliance value, an actor value, an item value, compressed signal values, or compact format values.

11. A computing apparatus comprising:

a processor; and a memory storing instructions that, when executed by the processor, configure the apparatus to perform operations comprising:

receive a plurality of data signals corresponding to a user, the plurality of data signals comprising a plurality of user raw records at corresponding time values;

compress the plurality of data signals using an incremental compression algorithm to form a single compressed iterative record by generating, for each data signal, a compressed chunk and appending the compressed chunk to the end of an existing single compressed iterative record without decompressing the existing single compressed iterative record;

organize the single compressed iterative record into hierarchical segments based on predefined time intervals using a waterfall data model; and store the single compressed iterative record in a first cloud storage system.

12. The computing apparatus of claim 11, wherein the instructions further configure the apparatus to:

receive new user data corresponding to the user;

apply the incremental compression algorithm to compress the new user data and generate a compressed new user data;

retrieve the single compressed iterative record corresponding to the user from the first cloud storage system;

generate an updated single compressed iterative record by appending the compressed new user data to the single compressed iterative record without decompressing the single compressed iterative record; and replace the single compressed iterative record with the updated single compressed iterative record in the first cloud storage system.

13. The computing apparatus of claim 12, wherein the instructions further configure the apparatus to:

store the updated single compressed iterative record in one or more of a plurality of data lakes in a second cloud storage system, each data lake providing the updated compressed iterative record to a corresponding processing application, the processing application comprising one of a time-based intelligence data analytics service application or an offline processing service application.

14. The computing apparatus of claim 13, wherein the instructions further configure the apparatus to:

store the updated single compressed iterative record in the second cloud storage system, wherein the first cloud storage system is associated with a substrate domain of the user, wherein the second cloud storage system is associated with a plurality of domains.

15. The computing apparatus of claim 12, wherein the instructions further configure the apparatus to:

store the updated single compressed iterative record in a data lake of a second cloud storage system, wherein the second cloud storage system comprises a large-scale data storage processor and analytics service application, wherein the large-scale data storage processor and analytics service application are configured to unzip the updated single compressed iterative record in runtime, process the unzipped data, and keep the updated single compressed iterative record stored in a zipped format.

16. The computing apparatus of claim 11, wherein the instructions further configure the apparatus to:

aggregate multiple data signals into a batch before compressing, wherein compress the plurality of data signals includes compressing the multiple data signals in the batch.

17. The computing apparatus of claim 11, wherein the single compressed iterative record is maintained in a just-in-time dynamic state for an accessible state without pre-configuring the plurality of data signals for a specific analytics application.

18. The computing apparatus of claim 11, wherein the instructions further configure the apparatus to:

provide on-demand decompression and analysis of selected data segments to support real-time analytics and dynamic decision-making processes.

19. The computing apparatus of claim 11, wherein the instructions further configure the apparatus to:

retrieve a specific segment of the single compressed iterative record from the first cloud storage system and decompressing only the retrieved segment for analysis; and detect changes in incoming data signals and applying the changes incrementally to the single compressed iterative record without full decompression.

20. A non-transitory computer-readable storage medium, the computer-readable storage medium including instructions that when executed by a computer, cause the computer to:

receive a plurality of data signals corresponding to a user, the plurality of data signals comprising a plurality of user raw records at corresponding time values;

compress the plurality of data signals using an incremental compression algorithm to form a single compressed iterative record by generating, for each data signal, a compressed chunk and appending the compressed chunk to the end of an existing single compressed iterative record without decompressing the existing single compressed iterative record;

organize the single compressed iterative record into hierarchical segments based on predefined time intervals using a waterfall data model; and store the single compressed iterative record in a first cloud storage system.

* * * * *